US008453828B2

(12) United States Patent
Satoh et al.

(10) Patent No.: US 8,453,828 B2
(45) Date of Patent: Jun. 4, 2013

(54) CONVEYING APPARATUS, IMAGE FORMING APPARATUS INCLUDING CONVEYING APPARATUS, AND CONVEYING METHOD

(75) Inventors: Nobuyuki Satoh, Kanagawa (JP); Masato Kobayashi, Kanagawa (JP); Yuichi Sakurada, Kanagawa (JP); Arata Suzuki, Kanagawa (JP); Tatsuhiko Okada, Saitama (JP); Daisaku Horikawa, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 140 days.

(21) Appl. No.: 12/877,419

(22) Filed: Sep. 8, 2010

(65) Prior Publication Data

US 2011/0056808 A1 Mar. 10, 2011

(30) Foreign Application Priority Data

Sep. 10, 2009 (JP) ................................ 2009-209847

(51) Int. Cl.
*B65G 13/06* (2006.01)

(52) U.S. Cl.
USPC .................... 198/783; 271/265.01; 271/10.05

(58) Field of Classification Search
None
See application file for complete search history.

(56) References Cited

U.S. PATENT DOCUMENTS

| | | | | |
|---|---|---|---|---|
| 5,552,691 | A * | 9/1996 | Pierce et al. | 318/652 |
| 6,471,202 | B1 * | 10/2002 | Sugimura | 271/10.11 |
| 2007/0152396 | A1 * | 7/2007 | Tanahashi et al. | 271/109 |

FOREIGN PATENT DOCUMENTS

| | | |
|---|---|---|
| JP | 3121432 | 10/2000 |
| JP | 3480604 | 10/2003 |
| JP | 3815055 | 6/2006 |
| JP | 3957295 | 5/2007 |

* cited by examiner

*Primary Examiner* — Kavel Singh
(74) *Attorney, Agent, or Firm* — Oblon, Spivak, McClelland, Maier & Neustadt, L.L.P.

(57) ABSTRACT

A conveying apparatus that rotates a roller and conveys an object, the conveying apparatus including: a roller driving unit that rotates the roller; a first operation unit that operates a rotation amount of the roller corresponding to a target movement amount of the object, on the basis of the target movement amount and information of a roller diameter, and quantizes the rotation amount; a random number generating unit that generates a random number; a second operation unit that operates a corrected rotation amount of the roller obtained by correcting the rotation amount, on the basis of the random number generated by the random number generating unit, a quantization error obtained by the first operation unit and a quantization method; and a driving control unit that controls driving of the roller according to the corrected rotation amount.

10 Claims, 3 Drawing Sheets

CONVEYING APPARATUS, IMAGE FORMING APPARATUS INCLUDING CONVEYING APPARATUS, AND CONVEYING METHOD

CROSS-REFERENCE TO RELATED APPLICATIONS

The present application claims priority to and incorporates by reference the entire contents of Japanese Patent Application No. 2009-209847 filed in Japan on Sep. 10, 2009.

BACKGROUND OF THE INVENTION

1. Field of the Invention

The present invention relates to a conveying apparatus, an image forming apparatus including the conveying apparatus, and a conveying method.

2. Description of the Related Art

For example, paper feed precision in inkjet printing is known to greatly affect a printing quality. In particular, when the head width and the conveyance amount are the same and when feed precision in joints of raster scanning is bad, stripes or voids are generated in an image, which severely degrade the image quality.

Incidentally, in the inkjet printing, in order to improve an image quality, resolution is increased and the number of dots per unit area is increased. However, there is a limitation in decreasing the pitches of ink ejecting nozzles, because of a processing problem, and about 300 [dpi] (=84.7 [μm]) becomes the limitation at the present time.

For this reason, in order to realize high resolution, it is considered to convey paper to cause ejection ports of the nozzles to come between dots, which are already struck on the paper at the pitches of 84.7 [μm], and strike the dots. In actuality, a sheet carrying technology is already known for mounting a high-resolution encoder on a paper carriage roller shaft and conveying a paper between the dots with high precision while performing feedback control.

Since the resolution of the current encoder is limited to about 2 to 4 [μm] and an excessively large cost is required to achieve an encoder with lower resolution, and the encoder with the lower resolution is not practical for a consumer product. The resolution of [10 μm] or more results in adverse effects of stripes to the sight. For this reason, when the head width and the conveyance amount are the same and when the paper can be conveyed at precision of 2 to 4 [μm] corresponding to the encoder resolution, a feed error does not becomes an error of level that causes a problem on an image.

When ink is repetitively ejected between the dots already struck to realize high resolution, dots may strike to be overlapped to the same dots to realize high density. In this case, circumstances become different. That is, when the paper is repetitively conveyed at precision of 2 to 4 [μm] (for example, 3 [μm]) corresponding to the encoder resolution, an error of 3 [μm] (±1.5 [μm] to be exact) is generated by a feed count.

Accordingly, when the dots are repetitively struck 16 times, a maximum deviation of 3×16=48 [μm] is generated. In the final feed, when the resolution is 600 [dpi], the deviation of about one dot or more is generated.

If the such a deviation is generated, smoothness of the image is deteriorated (deterioration of granularity), interference occurs between the deviated dots, and density irregularities of moire stripes are generated.

A method that prevents an image quality from being deteriorated due to the stripes included in the image is described in Japanese Patent No. 3,121,432. If the conveyance amount of recording paper is deviated from an encoder value due to sliding between the roller and the paper or thermal expansion of the roller, positional deviation in joints in one raster is generated, and an image quality is deteriorated due to the stripes included in the image. For this reason, in order to prevent the image quality from being deteriorated, in the above method, used are a first encoder to output a pulse signal corresponding to the rotation speed of a motor and a second encoder to output a pulse signal corresponding to the conveyance speed of the recording paper. Furthermore, in the above method, the actual conveyance amount of the recording paper on the assumption of the resolution obtained from the first encoder and a minimum raster number are calculated as a correction coefficient. Thereby, a deviation with the target conveyance amount is absorbed.

In the method that is disclosed in Japanese Patent No. 3,121,432, as described above, the two encoders are needed, and correction of ±1 pulse is performed when a count reaches a predetermined count. For this reason, an error is removed when the correction is performed while the error is gradually accumulated until the correction is performed. As a result, periodic irregularities are generated in the conveyance amount.

SUMMARY OF THE INVENTION

It is an object of the present invention to at least partially solve the problems in the conventional technology.

According to an aspect of the present invention, there is provided a conveying apparatus that rotates a roller and conveys an object, the conveying apparatus including: a roller driving unit that rotates the roller; a first operation unit that operates a rotation amount of the roller corresponding to a target movement amount of the object, on the basis of the target movement amount and information of a roller diameter, and quantizes the rotation amount; a random number generating unit that generates a random number; a second operation unit that operates a corrected rotation amount of the roller obtained by correcting the rotation amount, on the basis of the random number generated by the random number generating unit, a quantization error obtained by the first operation unit and a quantization method; and a driving control unit that controls driving of the roller according to the corrected rotation amount.

According to another aspect of the present invention, there is provided an image forming apparatus having the conveying apparatus of any one of claims 1 to 6, wherein the conveyed object is a recording medium.

According to still another aspect of the present invention, there is provided a conveying method for rotating a roller and conveying an object, the conveying method including: operating a rotation amount of the roller corresponding to a target movement amount of the object, on the basis of the target movement amount and information of a roller diameter, to quantize the rotation amount; generating a random number; operating a corrected rotation amount of the roller obtained by correcting the rotation amount of the roller, on the basis of the random number generated in the generating of the random number, a quantization error obtained in the operating of the rotation amount and a quantization method; and controlling driving of the roller according to the corrected rotation amount.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT(S)

Hereinafter, an embodiment of the present invention will be described with reference to the accompanied drawings.

A paper conveying apparatus according to this embodiment quantizes (rounding processing to be described below) the target moving distance (continuous value) into an actual feed pulse number (discrete value) countable by an encoder, determines a paper conveyance amount, rotates a motor functioning as a roller driving unit on the basis of the feed pulse number, and conveys paper.

That is, the paper conveying apparatus according to this embodiment stores a quantization error (rounding error) that is generated at the time of the quantization (rounding processing). Furthermore, the paper conveying apparatus generates a random number according to a ratio of the quantization error to one pulse countable by the encoder (that is, random number is a value between 0 and 1), and performs correction of ±1 pulse from the random number with respect to each feed pulse number.

Hereinafter, a characteristic of this embodiment will be specifically described using the drawings.

Figure 1:
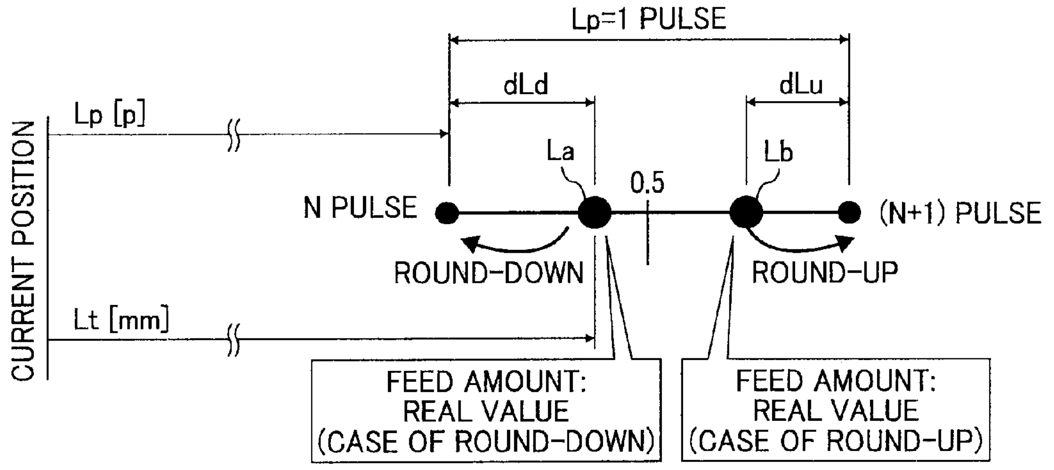
FIG. 1 is a diagram illustrating a mechanism of an error being generated by quantization.

FIG. 1 is a diagram illustrating a principle of an error being generated by quantization, which illustrates the case where the target moving distance is quantized by rounding processing in one pulse corresponding to resolution countable by the encoder.

When the target moving distance from the current position is defined as Lt [mm] and the resolution of the encoder is defined as We [mm/p] (which represents a movement amount per pulse), the actual movement amount (pulse number) Lp is represented as Lp=Lt/We [p]. In this case, since the pulse number Lp is an integer, the right side of the above equation, that is, Lt/We [p] is rounded up or rounded down and is rounded to an integer by the rounding processing. In this embodiment, the rounding processing is called the quantization.

In FIG. 1, when the position conveyed from the current position by the target moving distance Lt [mm] is defined as La, Lt/We [p] is equivalent to N pulses+fraction pulses. Since this fraction is less than 0.5 pulse in one pulse, the fraction is quantized into the N pulses where the conveyance amount decreases. In this case, an error is generated in one-time feed to the amount of a round-down quantization error dLd. The error is generated in a direction where the conveyance amount decreases.

When the position of the target moving distance Lt [mm] from the current position is defined as Lb, since a fraction of Lt/We [p] is equal to or more than 0.5 pulse in one pulse, the fraction is quantized into the position of (N+1) pulses where the conveyance amount increases. In this case, an extra feed error is generated in one-time feed by the amount of a round-up quantization error dLu, in contrast as the case of round-down.

Figure 2:
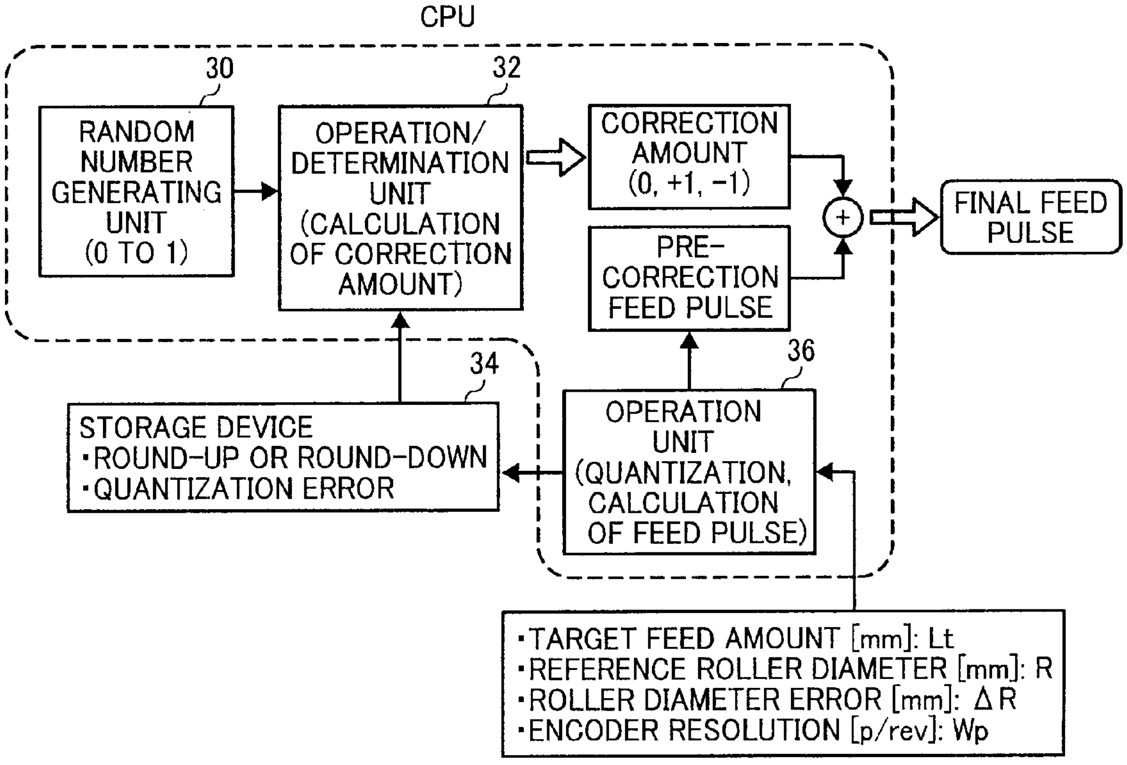
FIG. 2 is a block diagram illustrating individual units of an operation device that calculates a correction amount using a random number.

FIG. 2 is a block diagram illustrating individual units forming an operation device that calculates a correction amount using a random number.

The operation device is a CPU containing a random number generating unit 30, an operation/determination unit 32, and an operation unit 36 that performs quantization and calculates a feed pulse, all of which are formed as units to realize functions of the CPU. A storage device 34 is connected to the operation device.

In this case, the target moving distance (conveyance amount) [mm] (continuous value) is defined as Lt [mm], a reference radius [mm] (reference value in the drawings) of a carriage roller 18 (refer to FIG. 5) is defined as R, the deviation (error) from the reference value of the carriage roller radius R is defined as ΔR, and resolution [p/rev] of an encoder 22 (refer to FIG. 5) is defined as Wp (herein, pulse number per revolution of the carriage roller 18), and a feed pulse number is calculated.

That is, on the basis of the above information, the operation unit 36 quantizes a pre-correction feed pulse number Lp[p] ($Lp=(Lt\cdot Wp)/(2\pi\cdot(R+\Delta R)$ . . . (equation 1)) by rounding the right side of the equation 1 to an integer, and simultaneously stores a quantization error remaining at the time of the quantization and a quantization method (round-up or round-down) in the storage device 34.

The random number generating unit 30 generates a random number between 0 and 1 containing a decimal point, and outputs the correction amount as 0, −1, and +1 pulses, on the basis of the quantization error, which is operated by the operation/determination unit 32 and stored in the storage device 34 and information indicating whether the quantization method is the round-up or the round-down, as will be described below.

Next, the random number generating unit 30 adds the correction value and the pre-correction feed pulse number Lp and outputs the addition result as a final feed pulse number.

In the above description, the target moving distance is input as a command from an upper controller and the like. In order to make move an object, for example, a recording medium by the target moving distance, the pre-correction feed pulse number indicating the calculating rotation amount of the roller, which is the number of pulses by which the roller is rotated, is calculated on the basis of the target moving distance and roller diameter information.

This operation is executed using the above equation $Lp=(Lt\cdot Wp)/(2\pi\cdot(R+\Delta R))$. In this case, two information of the "reference roller diameter R" and the "roller diameter error ΔR" exists as the "roller diameter information", and each information is stored as a unique value in a storage device (not shown in the drawings) in the apparatus.

As the "roller diameter information", one value that includes the "reference roller diameter R" and the "roller diameter error ΔR" may be stored. As described above, when the pre-correction feed pulse number Lp[p] is calculated by the calculation equation (equation 1), the pulse number is an integer. Therefore, an error that is rounded up or rounded down to match the pulse number with the integral pulse number is a quantization error.

Figure 3:
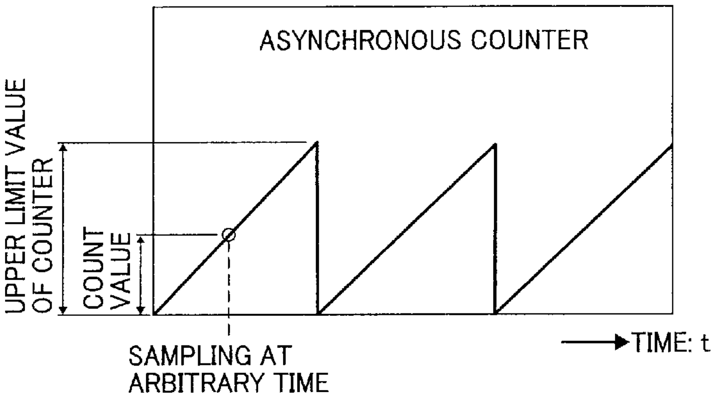
FIG. 3 is a diagram illustrating an example of a processing of generating a random number executed by a random number generating unit.

FIG. 3 is a diagram illustrating an example of a sequence of generating a random number executed by the random number generating unit 30.

The random number is generated by using a counter that counts up as time passes. This counter is configured to be reset to 0 when a count value reaches an upper limit and repeat a count-up operation again.

As shown in FIG. 3, when the counter samples the count value at arbitrary time from the asynchronous CPU, a random number between 0 and the upper limit of the counter is obtained. Dividing the sampled count value by the upper limit of the counter, a random number between 0 and 1 is obtained. In this case, the division is performed at single precision or double precision and a value obtained by the division is a value containing a decimal point.

Figure 4A:
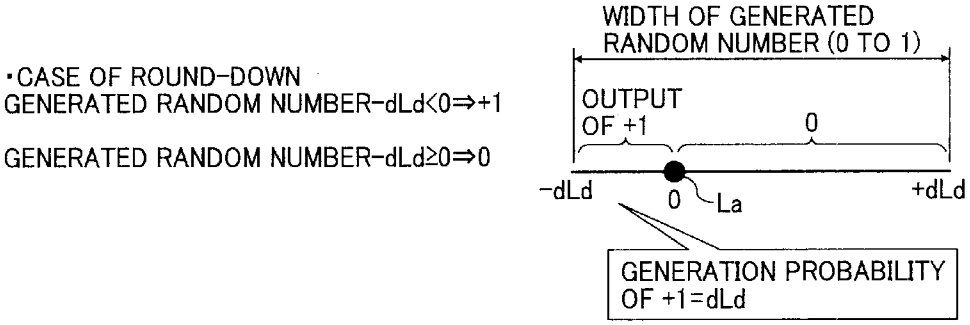
FIGS. 4A and 4B are schematic diagrams illustrating the operation of an operation/determination unit (correction amount calculation)
Figure 4B:
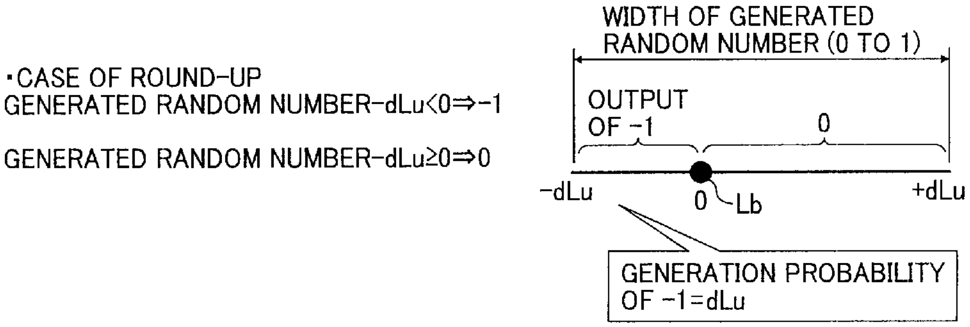

FIGS. 4A and 4B are schematic diagrams illustrating the operation of the operation/determination unit 32 (correction amount calculation).

When the round-down quantization error of the pre-correction feed pulse number Lp[p] in the storage device 34 is defined as dLd, first, dLd is subtracted from the random number generated by the random number generating unit (generated random number—"dLd").

Next, the operation/determination unit 32 can output +1 as a correction value when the subtraction result is less than 0, and output 0 when the subtraction result is equal to or more than 0.

By the above-described operation, the operation/determination unit 32 can generate +1 with a ratio (dLd) of the left side of La of FIG. 4A and generate 0 in the other cases.

Next, when the quantization method (round-down or round-up) of the pre-correction feed pulse number Lp[p] in the storage device 34 is the round-up, and when the round-up quantization error is defined as dLu, first, dLu is subtracted from the random number generated by the random number generating unit 30 (generated random number—"dLu").

Next, the operation/determination unit 32 outputs −1 as a correction value when the subtraction result is less than 0, and outputs 0 when the subtraction result is equal to or more than 0.

By the above-described operation, the operation/determination unit 32 can generate −1 with a ratio (dLu) of the left side of Lb of FIG. 4B, and generate 0 in the other cases.

Figure 5:
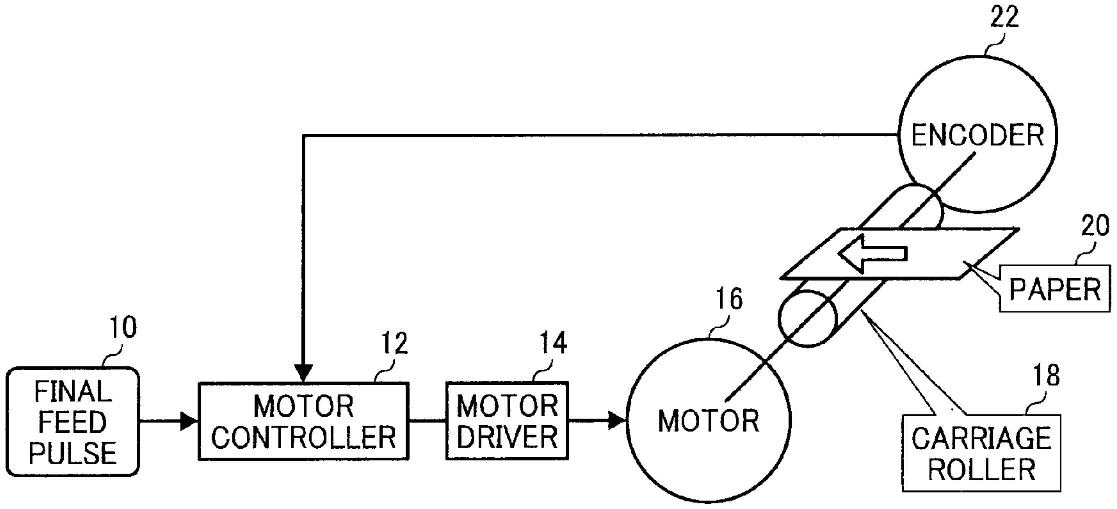
FIG. 5 is a schematic diagram illustrating an entire configuration of a sheet conveying mechanism.

FIG. 5 is a schematic view illustrating the entire configuration of the paper conveying mechanism that is provided in an image forming apparatus.

That is, on the basis of a command value of a final (that is, post-correction) feed pulse 10 transmitted from a main CPU (not shown in the drawings), a motor controller 12 generates a command voltage with respect to a motor 16 functioning as a roller driving unit, and drives the motor 16 through a motor driver 14. The motor 16 rotates the carriage roller 18 directly or through an appropriate deceleration mechanism and conveys paper 20 that is a recording medium. The paper 20 is nipped by the carriage roller 18 and a facing roller (not shown in the drawings) and is conveyed. In the carriage roller 18, the encoder 22 that corresponds to a carriage roller rotation amount acquiring unit and detects a rotation angle of the carriage roller 18 is mounted. An output pulse of the encoder 22 is input to the motor controller 12 that corresponds to a driving control unit. The motor controller 12 determines a speed profile from a count value of the encoder and the target position, performs feedback control, and rotates the motor 16 to the predetermined position.

As such, in this embodiment, the motor controller 12 controls to rotate the carriage roller 18 such that the rotation amount becomes the predetermined pulse number, while referring to the pulse number of the encoder 22.

When the motor is a pulse motor and the rotation of the carriage roller 18 and the rotation of the motor 16 are in a one-to-one relation, the rotation amount and the corrected rotation amount may be calculated on the basis of the pulses applied to the motor.

In the embodiment described above, the case where the rotation amount of the roller (carriage roller) is corrected on the basis of the pulse number of the encoder has been described. Instead, when the motor is the pulse motor and the motor is directly connected to the roller, the rotation amount of the roller may be corrected on the basis of the pulses applied to the motor. The recording medium (sheet) is exemplified, but the present invention can be applied to the case where a belt is conveyed by a roller.

Furthermore, the encoder that corresponds to the roller rotation amount acquiring unit is mounted in the carriage roller. However, the encoder may be mounted in a roller that is driven by a recording medium (for example, paper) that is a conveyed object. Alternatively, the conveyed object (paper) may be optically read for measuring conveyance distance thereof, and the rotation amount of the rotation roller may be calculated on the basis of the measured conveyance distance.

According to this embodiment described above, the following effects can be obtained.

Even when the ink is ejected onto the image where the dots are already struck plural times and an image is generated, an influence of the quantization error based on the encoder resolution is minimized, the positional deviation is suppressed, smoothness of the image is maintained, and density irregularities are not generated. Therefore, a high-quality image can be obtained.

Even though the plural encoders are not used, correction is enabled by only one encoder, and a cost can be reduced.

A high-quality image can be obtained without generating periodic irregularities (position irregularities and color irregularities), for a predetermined raster number.

The quantization error (rounding error) that is generated when the target moving distance (continuous value) is quantized (rounded) into the actual feed pulse number (discrete value) countable by the encoder is stored. Furthermore, a random number (0 to 1) is generated corresponding to a ratio of the quantization error to one pulse of the resolution of the encoder, and correction of ±1 pulse based on the random number is performed for each feed. As a result, an accumulation error in the repetitive feed is removed.

Since the correction value (0, ±1) is determined using the random number, the periodic (position or density) irregularities are not generated.

According to the present invention, the conveyance amount of the carriage roller can be appropriately corrected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conveying apparatus that rotates a roller and conveys an object, the conveying apparatus comprising:

a roller driving unit that rotates the roller;

a first operation unit that operates a rotation amount of the roller corresponding to a target movement amount of the object based on the target movement amount and information of a roller diameter, the first operation unit quantizing the rotation amount to an integer which is a driving pulse number of the roller driving unit;

a random number generating unit that generates a random number;

a second operation unit that operates a corrected rotation amount of the roller obtained by correcting the rotation amount based on:

the random number generated by the random number generating unit, a quantization error which is a fraction obtained when the first operation unit quantizes the rotation amount to the integer by performing one of rounding up and rounding down of the rotation amount, and a quantization method on whether the quantization error is obtained by performing the rounding up or the rounding down of the rotation amount;

a roller rotation amount acquisition unit that outputs a pulse according to the rotation amount of the roller; and a driving control unit that controls driving of the roller according to the corrected rotation amount and the pulse output from the roller rotation amount acquisition unit.

2. The conveying apparatus according to claim 1, further comprising:

a storage unit that stores the quantization error and the quantization method, wherein the first operation unit acquires the rotation amount of the roller using a count value obtained by the roller rotation amount acquisition unit and performs the quantization in accordance with resolution of the roller rotation amount acquisition unit.

3. The conveying apparatus according to claim 2, wherein the random number generating unit generates the random number in a range of the quantization error, and wherein the second operation unit operates the corrected rotation amount by adding or subtracting a rotation amount corresponding to the resolution to or from the rotation amount of the roller, or without executing the addition and the subtraction based on the quantization error, the random number, and the quantization method.

4. The conveying apparatus according to claim 2, wherein the roller rotation amount acquiring unit is an encoder that is mounted to a carriage roller of the object.

5. The conveying apparatus according to claim 2, wherein the roller rotation amount acquiring unit is an encoder that is mounted to a roller driven by the conveyed object.

6. The conveying apparatus according to claim 2, wherein the roller rotation amount acquiring unit is a position measuring unit that optically reads the conveyed object and measures the conveyance distance.

7. An image forming apparatus comprising:

a conveying apparatus that rotates a roller and conveys an object, the conveying apparatus including a roller driving unit that rotates the roller, a first operation unit that operates a rotation amount of the roller corresponding to a target movement amount of the object based on the target movement amount and information of a roller diameter, the first operation unit quantizing the rotation amount to an integer which is a driving pulse number of the roller driving unit, a random number generating unit that generates a random number, a second operation unit that operates a corrected rotation amount of the roller obtained by correcting the rotation amount based on:

the random number generated by the random number generating unit, a quantization error which is a fraction obtained when the first operation unit quantizes the rotation amount to the integer by performing one of rounding up and rounding down of the rotation amount, and a quantization method on whether the quantization error is obtained by performing the rounding up or the rounding down of the rotation amount, a roller rotation amount acquisition unit that outputs a pulse according to the rotation amount of the roller, and a driving control unit that controls driving of the roller according to the corrected rotation amount and the pulse output from the roller rotation amount acquisition unit, wherein the conveyed object is a recording medium.

8. A conveying method for rotating a roller and conveying an object, the conveying method comprising:

operating a rotation amount of the roller corresponding to a target movement amount of the object based on the target movement amount and information of a roller diameter, to quantize the rotation amount to an integer which is a driving pulse number of a roller driving unit that rotates the roller;

generating a random number;

operating a corrected rotation amount of the roller obtained by correcting the rotation amount of the roller based on:

the random number generated in the generating of the random number, a quantization error which is a fraction obtained when, in the operating of the rotation amount, the rotation amount is quantizes to the integer by performing one of rounding up and rounding down of the rotation amount, and a quantization method on whether the quantization error is obtained by performing the rounding up or the rounding down of the rotation amount;

outputting a pulse according to the rotation amount of the roller via a roller rotation amount acquisition unit; and controlling driving of the roller according to the corrected rotation amount and the pulse output from the roller rotation amount acquisition unit.

9. The conveying method of claim 8, further comprising:

acquiring the rotation amount of the roller via the roller rotation amount acquisition unit; and storing the quantization error and the quantization method, wherein in the operating of the rotation amount of the roller, the quantization is performed in accordance with resolution of the roller rotation amount acquiring unit.

10. The conveying method of claim 9, wherein the random number generated is in a range of the quantization error, and wherein in the operating of the corrected rotation amount of the roller, the corrected rotation amount is operated by adding or subtracting a rotation amount corresponding to the resolution to or from the rotation amount of the roller, or without executing the addition and the subtraction based on the quantization error, the random number, and the quantization method.

* * * * *